United States Patent [19]

Tanaka

[11] Patent Number: 5,320,480

[45] Date of Patent: Jun. 14, 1994

[54] GOODS HANDLING METHOD AND APPARATUS THEREOF

[75] Inventor: Nobuhiro Tanaka, Saitama, Japan

[73] Assignee: Kao Corporation, Tokyo, Japan

[21] Appl. No.: 1,774

[22] Filed: Jan. 8, 1993

Related U.S. Application Data

[62] Division of Ser. No. 625,922, Nov. 27, 1990, Pat. No. 5,211,702.

[30] Foreign Application Priority Data

Nov. 29, 1989 [JP] Japan .................. 1-309502
Dec. 4, 1989 [JP] Japan .................. 1-314530

[51] Int. Cl.$^5$ .............................. B65G 59/04
[52] U.S. Cl. ...................... 414/795.9; 414/798.9
[58] Field of Search ............. 414/795.9, 796, 796.7, 414/797, 798.9

[56] References Cited

U.S. PATENT DOCUMENTS

| 3,075,652 | 1/1963 | McCoy | 414/795.9 |
| 3,631,992 | 1/1972 | Dickinson | 414/795.9 |

FOREIGN PATENT DOCUMENTS

| 339610 | 11/1989 | European Pat. Off. . | |
| 2306691 | 8/1974 | Fed. Rep. of Germany ... | 414/798.9 |
| 50-128876 | 10/1975 | Japan . | |
| 56-48550 | 5/1981 | Japan . | |
| 8300942 | 3/1983 | World Int. Prop. O. . | |

Primary Examiner—Michael S. Huppert
Assistant Examiner—Thomas J. Brahan
Attorney, Agent, or Firm—Birch, Stewart, Kolasch & Birch

[57] ABSTRACT

A goods handling method includes the steps of sequentially taking out a desired number of goods from a group of accumulation of goods formed of a plurality of goods accumulated in a height direction, a plurality of goods accumulated in a depth direction, and one or more goods accumulated in the width direction and discharging such removed goods into a container, the goods handling method further including the steps of arranging the height of a bottom surface of goods to be removed among the group of accumulation of goods generally equal to the height of a goods receiving table and thereafter, removing the goods onto the receiving table, discharging such removed goods into the container, moving goods on the second row to the front row after all goods on the front row have been removed, and then removing the goods, and a goods handling apparatus for carrying out the method.

5 Claims, 14 Drawing Sheets

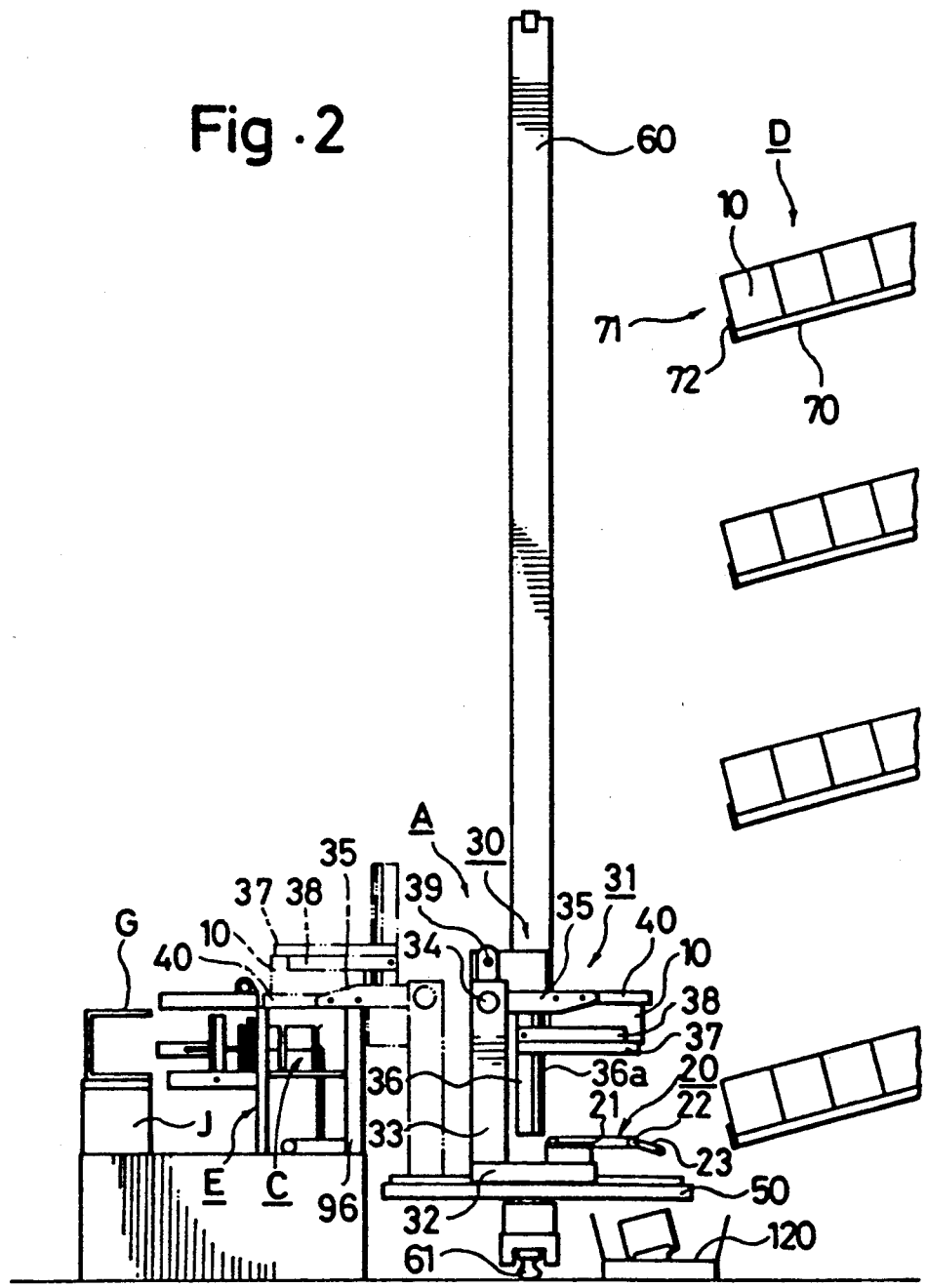

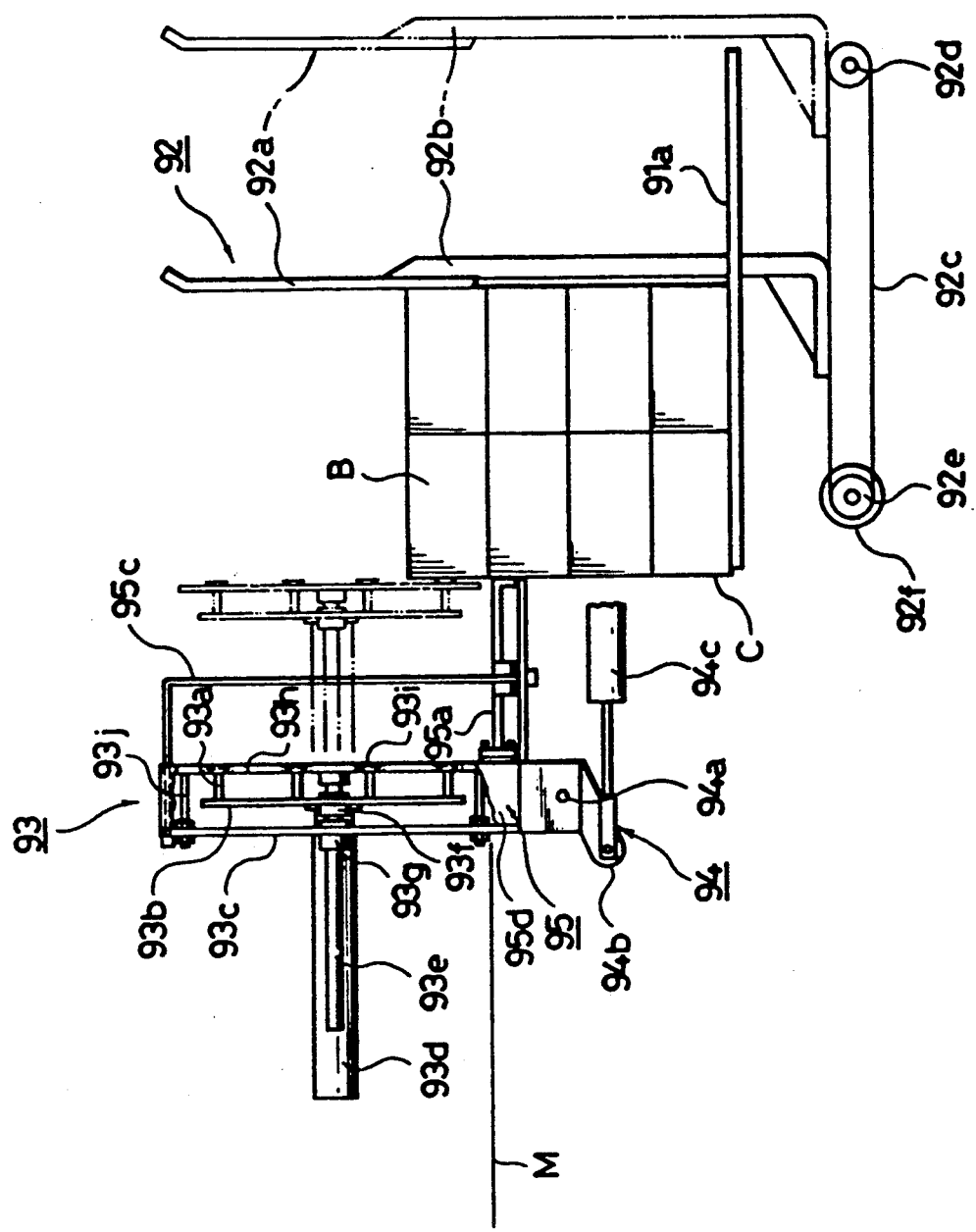

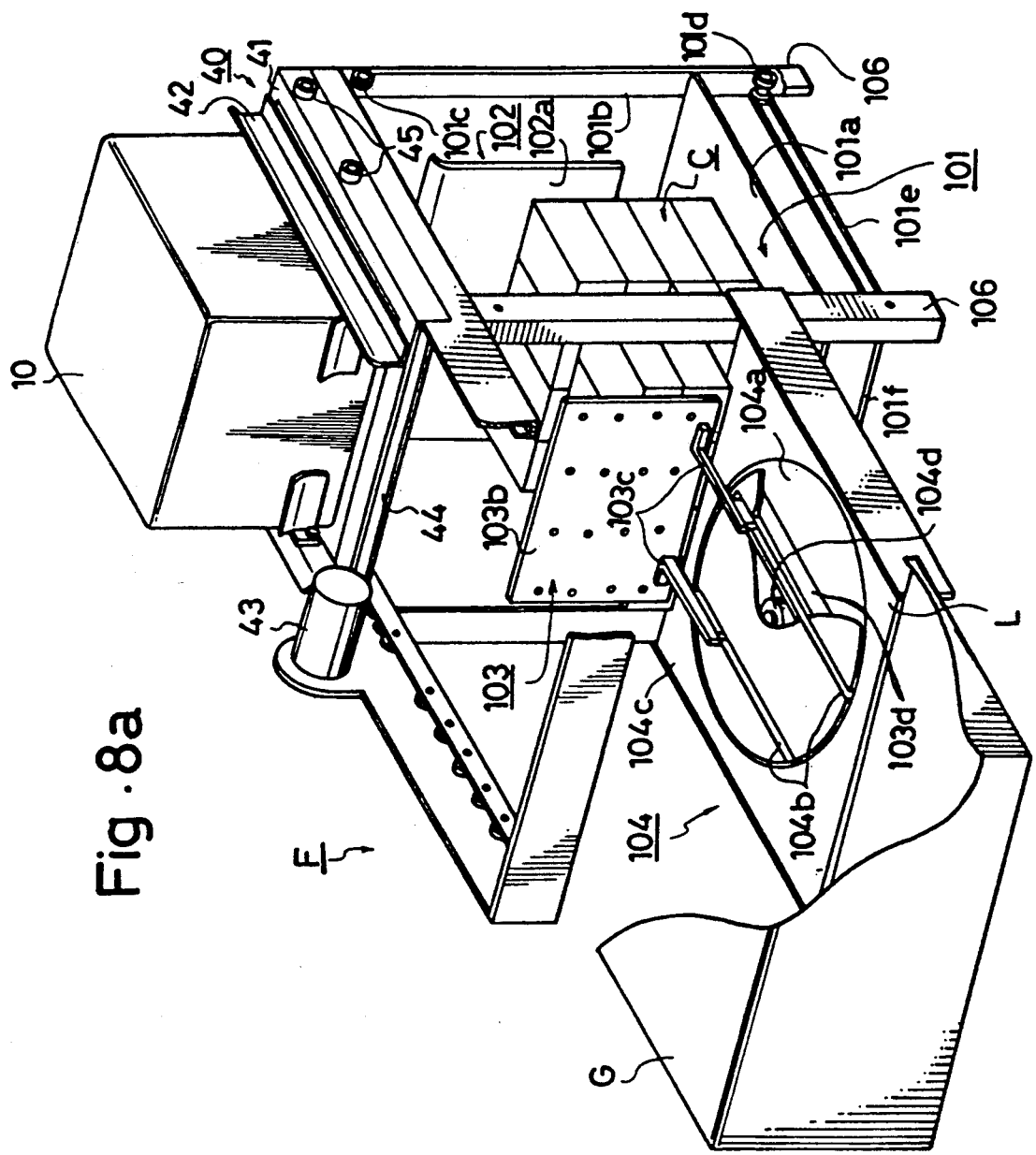

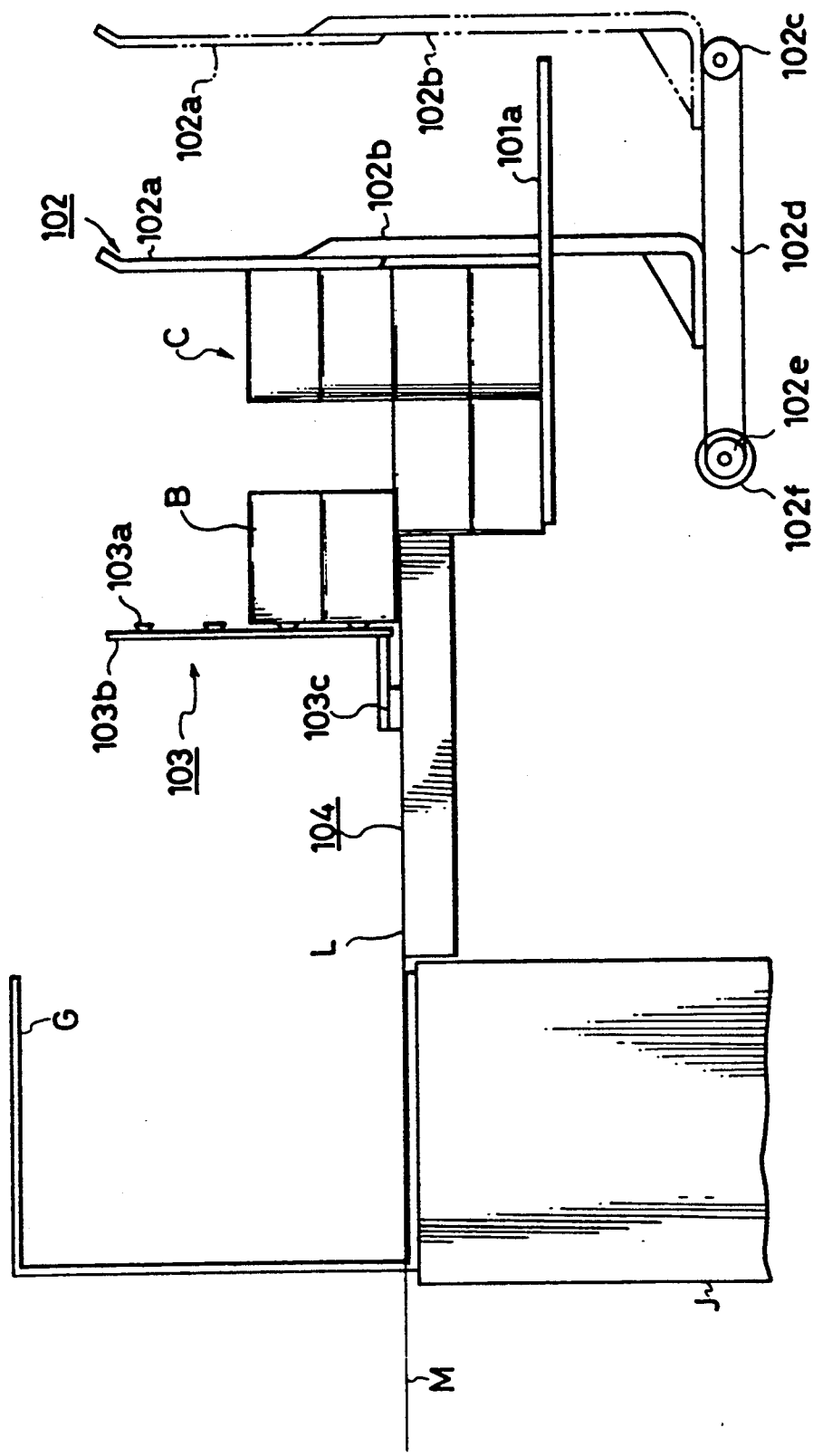

GOODS HANDLING METHOD AND APPARATUS THEREOF

This application is a divisional of copending application Ser. No. 07/625,922, filed on Nov. 27, 1990, now U.S. Pat. No. 5,211,702, the entire contents of which are hereby incorporated by reference.

BACKGROUND OF THE INVENTION

1. Field of the Invention

This invention relates to a goods handling method and an apparatus thereof for removing a desired number of goods from a group of accumulated goods which is formed by accumulating goods and discharging such removed goods into a container, and more particularly to a goods handling method and an apparatus thereof which can be suitably used for picking up goods in a distribution center or for similar purposes.

2. Description of the Prior Art

As the prior art regarding a goods handling method and an apparatus thereof, there are known, for example, those as disclosed in Japanese Utility Model Early Laid-open Publication Nos. Sho 50-128876 and Sho 56-48550. The prior art disclosed in these publications will be described. In Japanese Utility Model Early Laid-open Publication No. Sho 50-128876, there is disclosed an automatic type part warehouse an end face of which is divided into lines (lateral direction) and rows (vertical direction), end faces of each line and row are provided with a window for removing and storing goods cases, a plurality of goods cases being stored on an inclined floor in the inner direction, wherein an elevator having a lateral width equal to one line portion the warehouse is vertically movably disposed in such a manner as to contact the end face of the take-out window, and by reciprocally moving a rotatable sucking pad mounted on the elevator in the depth direction of the warehouse, the part case can be taken out to the elevator side without being interfered with by a part case stopper mounted to an end portion of the inclined floor.

Also, in Japanese Utility Model Early Laid-open Publication No. Sho 56-48550, there is disclosed a brick feeder for feeding bricks accumulated on a lifter by pushing out bricks on the top stage onto a feed conveyor by a pusher at every stage as the lifter is lifted up stage by stage.

However, the above-mentioned prior art had the following problems.

That is, in the automatic type part warehouse disclosed in Japanese Utility Model Early Laid-open Publication No. Sho 50-128876, although part cases (goods) can be taken out, one by one, from the end faces of the take-out windows formed by dividing the end face of the warehouse in lines and rows, there is no description or suggestion at all about a plurality of desired goods being removed from a group of accumulated goods formed by accumulating goods and such removed goods are discharged into a container, etc.

Also, as the brick feeder disclosed in Japanese Utility Model Early Laid-open Publication. No. Sho 56-48550 is designed such that the bricks (goods) can be taken out at every stage, a desired number of goods cannot be taken out. Also, in case there is formed a step between goods which are arranged in the goods take-out direction, it sometimes happened that goods were caught by the step and could not be taken out or goods were damaged. Furthermore, there is no description or suggestion at all about how goods, which have been taken out onto the feed conveyor are discharged into a container.

SUMMARY OF THE INVENTION

It is therefore an object of the present invention to provide a goods handling method and an apparatus thereof for removing a desired number of goods from a group of accumulated goods which is formed by accumulating goods and discharging such removed goods into a container, and particularly to a goods handling method and an apparatus thereof which can be suitably used for picking up goods in a distribution center or for similar purposes.

The object of the present invention can be achieved by a goods handling method comprising sequentially taking out a desired number of goods from a group of accumulated goods formed of a plurality of goods accumulated in the height direction, a plurality of goods accumulated in the depth direction, and one or more goods accumulated in the width direction and discharging such removed goods into a container, said goods handling method further comprising arranging the height of a bottom surface of goods to be taken out among said group of accumulated goods generally equal to the height of a goods receiving table and thereafter, placing said goods onto said receiving table, discharging such removed goods into said container, moving goods on the second row to the front row after all goods on the front row have been removed, and then taking out said goods.

Also, the object of the present invention can be achieved by providing a goods handling apparatus as an apparatus favorably used for carrying out the above-mentioned goods handling method, in which a desired number of goods are sequentially removed from a group of accumulated goods formed of a plurality of goods accumulated in the height direction, a plurality of goods accumulated in the depth direction and one or more goods accumulated in the width direction and such removed goods are discharged into a container, said goods handling apparatus (first apparatus invention) comprising a lifting device able to move upward and downward while supporting said group of accumulated goods, a sucking device for sucking and removing a desired number of goods by reciprocally moving sucking tools corresponding to the arrangement of goods of said group of accumulated goods in said depth direction, a goods restraining device for moving said group of accumulated goods toward said sucking device, a goods receiving table for receiving the goods taken out by said sucking tools of said sucking device, and a moving device for moving the removed goods onto said goods receiving table to a pushing position, the goods which have been moved to said pushing position being pushed and discharged into said container, by said goods receiving table.

According to a method of the present invention using the first apparatus invention, the bottom level of a desired goods among the group of accumulated goods is made generally equal to the height of the goods receiving table by the lifting apparatus, a desired goods is sucked by the sucking device in a state where the goods are restrained by the goods restraining device and drawn out onto the goods receiving table, then the goods, which have been drawn out onto the goods receiving table, are moved to a push-in portion for pushing goods into a container by the moving device, and thereafter, the goods can be pushed and discharged into the container by the goods receiving table.

Also, the object of the present invention can be achieved by providing a goods handling apparatus as another apparatus favorably used for carrying out the above-mentioned goods handling method, in which a desired number of goods sequentially removed from a group of accumulated goods formed of a plurality of goods accumulated in the height direction, a plurality of goods accumulated in the depth direction and one or more goods accumulated in the width direction and such removed goods are discharged into a container, said goods handling apparatus (second apparatus invention), comprising a lifting device able to move upward and downward while supporting said group of accumulated goods, a sucking device for sucking and removing a desired number of goods by reciprocally moving sucking devices corresponding to the arrangement of goods of said group of accumulated goods in said depth direction, a goods restraining device for moving said group of accumulated goods toward said sucking device, a goods receiving table for receiving the removed goods taken out by said sucking tools of said sucking device, and a moving device for moving the goods onto said goods receiving table to a pushing position, the goods which have been moved to said pushing position being pushed and discharged into said container by said sucking device.

According to a method of the present invention using the second apparatus invention, the bottom level of a desired goods among the group of accumulation goods is made generally equal to the height of the goods receiving table by the lifting apparatus, desired goods are sucked by the sucking device in a state where the goods are restrained by the goods restraining device and drawn out onto the goods receiving table, then the goods, which have been drawn out onto the goods receiving table, are moved to a push-in portion for pushing goods into a container by the moving device, and thereafter, the goods can be pushed and discharged into the container by the sucking device.

BRIEF DESCRIPTION OF THE DRAWINGS

FIG. 2 is a side view thereof;

FIG. 3b is a side view showing an important portion for explaining the goods take-out operation of the goods take-out device shown in FIG. 3a;

FIG. 3c is a perspective view showing the operation for pushing goods into a container using the push-in device of the goods take-out device shown in FIG. 3a;

FIG. 8a is a perspective view showing a goods take-out device, in its partly cut-away state, as another embodiment of a goods handling apparatus of the present invention;

FIG. 8b is a side view showing an important portion for explaining the operation of the goods take-out operation of the goods take-out device shown in FIG. 8a;

DETAILED DESCRIPTION OF THE INVENTION

A goods handling method of the present invention will now be described together with goods handling facilities to which various embodiments of goods handling apparatuses of the first apparatus invention and the second apparatus invention capable of favorably carrying out this method are applied with reference to FIGS. 1 through 10d. The various embodiments set forth hereinafter are suitable for removing box-shaped goods such as detergent for clothing and bag-shaped goods such as a paper diaper from a case such as a corrugated carton box having an opening portion respectively.

EMBODIMENT 1

This embodiment is one embodiment of the first apparatus invention and one embodiment of the method of the present invention in which the apparatus of this embodiment is used.

Figure 1:
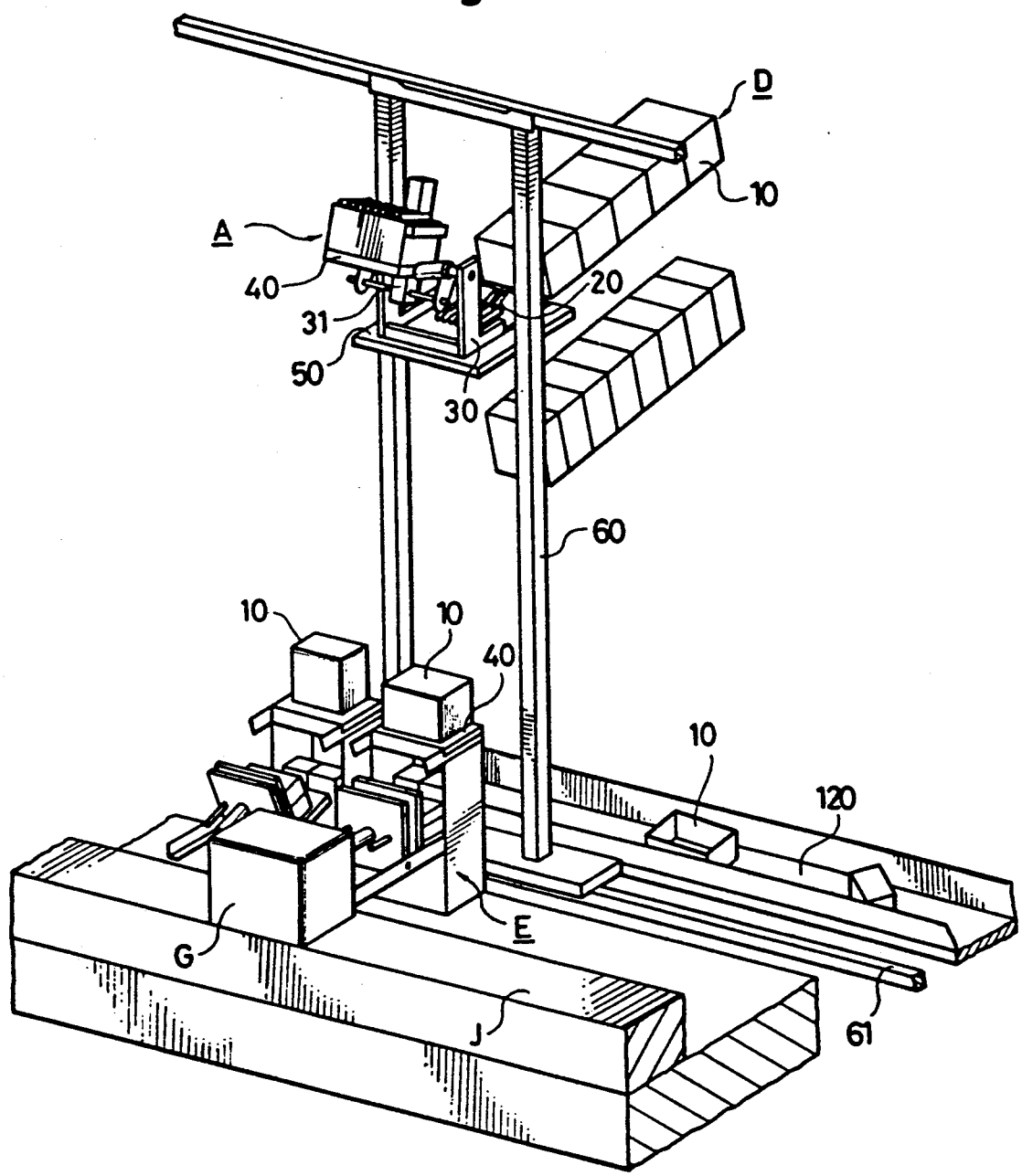
FIG. 1 is a perspective view showing one embodiment of a goods handling facility using a goods handling apparatus (first apparatus invention) of the present invention.

A goods handling facility to which a goods take-out device E according to one embodiment of the first apparatus invention is applied, as shown in FIGS. 1 and 2, comprises a storage facility for storing cases 10 containing goods B as a goods accumulation group as will be described afterward in a plurality of stages and a plurality of rows, a goods shifting apparatus A disposed in such a manner as to be able to move upward and downward and leftward and rightward at a front end of the storage facility D and adapted to shift the cases 10 from the storage facility D, a goods removal/extraction device E disposed adjacent to the goods shifting apparatus A and adapted to remove a desired number of goods B from the goods accumulation group C which have been shifted from the cases 10 by the goods shifting apparatus A, a container G for containing goods B taken out of the goods removal device E, and a carrier conveyor J for carrying the container G to the next process.

The goods shifting apparatus A comprises a case removal device 20 for removing a case 10 from the storage facility D, a superposing device 31 for lifting the case 10 taken out by the case removal device 20 and superposing the same on a goods removal tool 40 disposed thereabove, an inverting device 30 for inverting the case 10 and the goods removal tool 40 to the goods removal device E side as will be described afterward, a carriage 50 with the case removal device 20, the inverting device 30 placed thereon, and a stacker crane 60 for vertically movably supporting the carriage 50 and able to reciprocally move rightward and leftward.

Also, the goods removal device E of this embodiment, as shown in FIGS. 2, 3a, 3b, and 3c, comprises a lifting device 91 for receiving and supporting only the goods accumulation group C from the case 10 inverted by the goods shifting apparatus A through the goods removal tool 40 and for ascending and descending the bottom surface of the desired number of goods B to the take-out position, a goods restraining device (movement restraining device) 92 for restraining the goods accumulation group C within the lifting device 91 in order to prevent movement in the direction opposite to the removal direction of the goods accumulation group C and for moving the goods accumulation group C toward the sucking device 93, the sucking device 93 for reciprocally moving the sucking tools (sucking pads) 93a corresponding to the arrangement of the goods B of the goods accumulation group C in the depth direction and for sucking and removal a desired number of goods B, a goods receiving table 95a (goods receiving plate) 95a for receiving the goods B removed by the sucking pad 93a of the sucking device 93, and a moving device 94 for moving the goods B removed to the goods receiving plate 95a to the push-in position, the goods B moved to the push-in position being pushed into the container G by the goods receiving table 95a.

Next, the various component elements constituting the goods handling facilities will be described in order and in detail.

The goods removal tool 40, the case removal device 20, and the inverting device 30 constituting the goods shifting apparatus A will be described with reference to FIGS. 1 through 3c.

The case removed device 20, as shown in FIG. 2, is disposed on a traveling table 32, and comprises a stationary conveyor 21, and a swing conveyor 23 connected next to the stationary conveyor 21 through a supporting shaft 22, the case 10 being removed from a gravity flow rack 70 of the storage facility D by swinging the front end side of the swing conveyor 23 upward and downward.

The inverting device 30, as shown in FIG. 2, comprises a traveling table 32 for traveling in the flowing direction of the cases 10 stored in the gravity flow rack 70 on a carriage 50 of a stacker crane 60, that is, in the forward and backward direction with reference to the gravity flow rack 70. A frame 33 erected on the traveling table 32, a rotational shaft 34 mounted in the vicinity of the upper end of the frame 33, a first clamping hand 35 mounted on the rotational shaft 34 in such a manner as to be opened and closed in the axial direction thereof (hereinafter referred to as the "right and left direction") and adapted to clamp the goods removal tool 40, a second clamping handle 37 disposed in such a manner as to be able to move upward and downward along a guide member 36 hanging down in the vicinity of the rotational shaft 34 side while clamping the case 10 and adapted to superpose the case 10 on the goods take-out tool 40 clamped by the first clamping hand 35, a centering hand 38 for centering a case 10 on the second clamping hand 37, and others. Among them, the first and second clamping hands 35, 37, the centering hand 38, and the guide member 36 constitute the superposing device 31. Accordingly, the inverting device 30 is constructed such that the superposing device 31 is integrally rotated about the rotational shaft 34. The first clamping hand 35 is constructed in such a manner as to be opened and closed in accordance with activation of a screw shaft 39 mounted on a guide member 36 in parallel relation with the rotational shaft 34, that is, screw shaft 39 provided with a right screw formed on one side from the center thereof and a left screw found on the other side. The first clamping hand 35 is provided with projecting portions (not shown) formed on the inner side thereof and adapted to engage with engaging concave portions (see FIG. 3a) formed in both sides of a frame 41 of the goods removal tool 40 so that the goods removal tool 40 is firmly clamped by the first clamping hand 35 and will not be dropped during the inverting operation. Likewise, the centering hand 38 is disposed in parallel relation with the rotational shaft 34 and opened and closed in accordance with activation of a similar screw shaft (not shown) to the screw shaft 39 supported by the second clamping hand 37. Also, the guide member 36 is provided on its inner side with a screw shaft 36a, and by driving the screw shaft 36a, the second clamping hand 37 is moved upward and downward.

Also, it is designed such that the goods removal tool 40, as shown in FIG. 2 is placed on the goods removal device E from a state where the goods removal tool 41 is located above the case removal device 20 by the inverting device 30. The goods removal tool 40 comprises a frame 41, a pair of guides 42, 42 fixedly attached to the frame 41 therealong, and a shutter 44 reciprocally moved along the guides 42, 42 through a motor 43 to open and close an opening portion of the case 10 (see FIG. 3a). Also, each of guides 42, 42 is provided with a needle-like projection (not shown) formed on its surface contacting with the case 10 in order to fix the case 10. Accordingly, by lifting a lifting table 91a constituting a lifting device 91 of the goods removal device E and opening the opening portion of the case 10 positioning at a lower side thereof by drawing out the shutter 44 and then lowering the lifting table 91a, the goods accumulation group C can be removed from the case 10. After the goods accumulation group has been shifted to the goods removal device E from the case 10 through the goods removal tool 40, a desired goods B among the goods accumulation group C is moved to the container G in accordance with a picking command.

Furthermore, the stacker crane 60 is designed to travel on a travel rail 61 laid along removal frontages 71 of the respective gravity flow racks 70 and is provided with the case removal device 20 and the inverting device 30 disposed on the carriage 50 such that the devices 20 and 30 can be moved upward and downward.

Also, the gravity flow racks 70 of the storage facilities D comprise inclined roller conveyors of multi-row and multi-stage. Each gravity flow rack 70 is provided with the removal frontage 71 formed at its inclined front end, and the inclined roller conveyor is provided at its front end portion with a stopper 72, so that the case 10 supplied is slid down the inclined roller conveyor by its dead weight and retained by the stopper 72.

Next, the goods removal device E of the first apparatus invention will be described with reference to FIGS. 3a, 3b, and 3c.

The goods removal device E is disposed between the carrier conveyor J for carrying the container G and the travel rail 61. The goods removal device E is adapted to receive the goods accumulation group C from the goods removal tool 40 and pushes a required number of goods B into the container G. The lifting device 91 receives the goods accumulation group C taken out of the case 10 through the goods removal tool 40 and moves upward and downward to a desired position. The lifting device 91, as shown in FIG. 3a, comprises the lifting table 91a on which the goods accumulation group C are placed, a wire 91b for lifting the four corners of the lifting table 91a, and a pair of pulleys 91c, 91d having the wire 91b wound thereon and rotatably mounted on the frame 96, these component parts being actuated by a motor 91g through a belt 91e wound on the pulley 91d, a drive shaft 91f connected with the belt 91e, and the like.

Figure 3A:
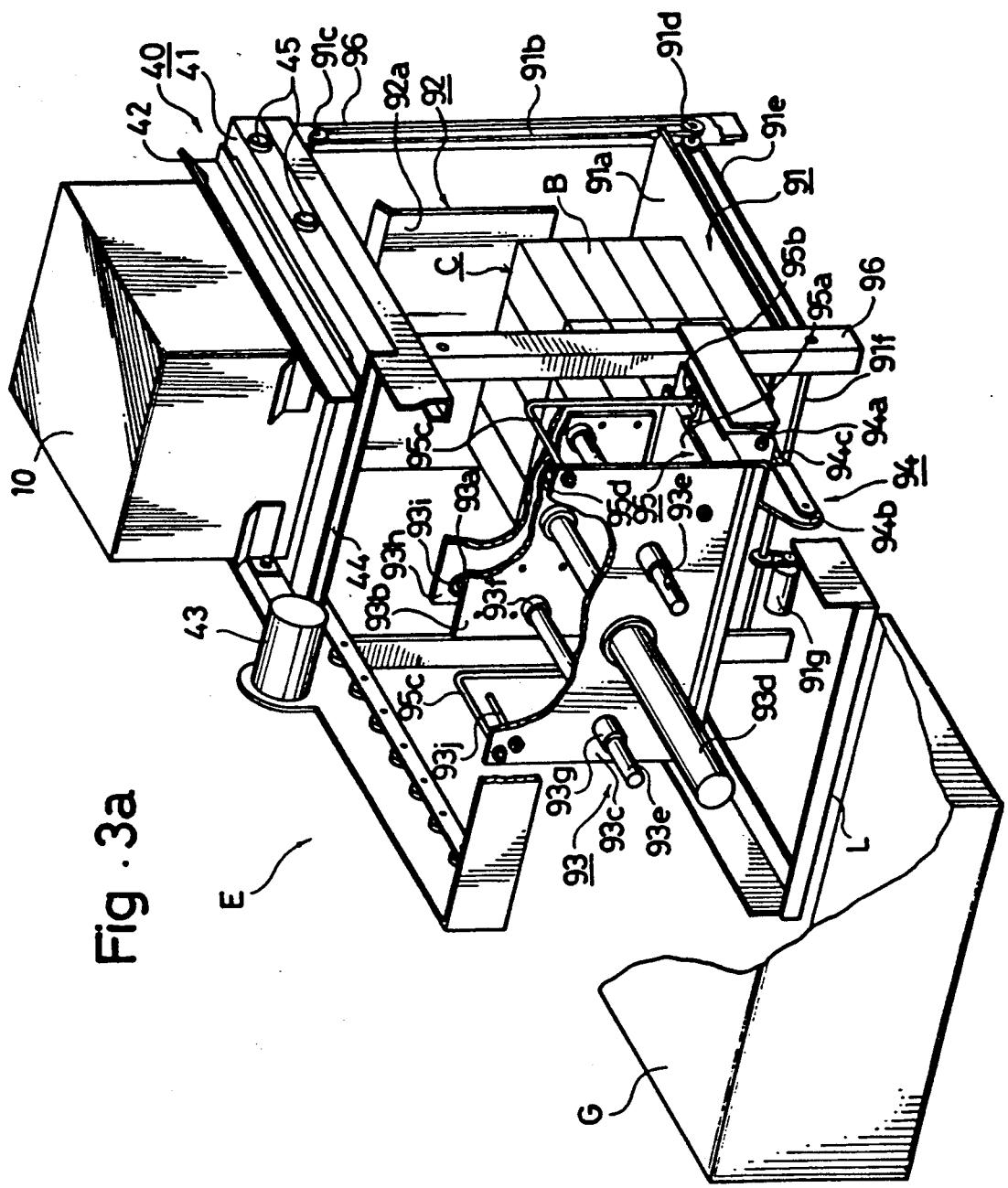
FIG. 3a is a perspective view showing a goods take-out one embodiment of the goods handling apparatus of the present invention.
Figure 3C:
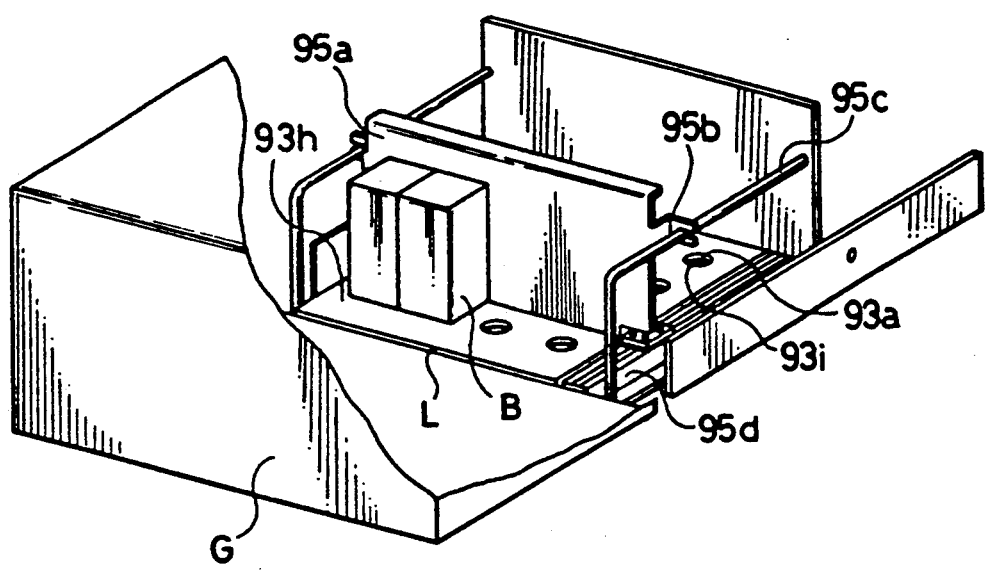

The movement restraining device 92, as shown in FIGS. 3a and 3b, contacts the goods accumulation group C supported on the lifting table 91a of the lifting device 91 from a rear side (right-hand side in FIG. 3b) thereof and moves them toward the container G. The movement restraining device 92 comprises a pair of sprockets 92d, 92e disposed beneath front and rear leg portions of the frame 96, a chain 92c looped around the sprockets 92d, 92e, and a movement restraining plate 92a connected with the chain 92e and erected around the leg portions through a mounting metal piece 92b, the movement restraining plate 92a being able to be reciprocally moved forward and backward by a drive motor 92f. The mounting metal piece 92b for supporting the movement restraining plate 92a is reciprocally moved along a cut-away groove (not shown) formed in the lifting table 91a. By moving (advancing) the movement restraining plate 92a toward the container G, the goods accumulation group C is brought to a front edge of the lifting table 91a and the backward movement of each goods B is restrained. The goods accumulation group C advanced to the front edge of the lifting table 91a through the movement restraining device 92 is moved upward and downward to a position where the bottom level of desired goods B corresponds to the picking number by the lifting device 91, and a desired number of goods B are drawn into the goods receiving plate 95a by the sucking device 93.

The sucking device 93 comprises sucking pads 93a disposed in such a manner as to correspond to X pieces of goods B arranged in the width direction and Y pieces of goods B arranged in the height direction on a surface (front surface) on the side for receiving the goods accumulation group C, a plate 93b on which the sucking pads 93a are attached, a base plate 93c juxtaposed to the plate 93b, and a cylinder 93d which is connected at its front end with the plate 93b disposed generally at the center of the base plate 93c, the sucking pads 93a being reciprocally moved in the depth direction (forward and backward direction) of the goods accumulation group C by the cylinder 93d, a pair of guide bosses 93f, 93f and another pair of guide bosses 93g, 93g being fixedly disposed to the plate 93b and the base plate 93c respectively (see FIG. 3a), a slide shaft 93e being thrust therethrough, a plate 93h being movable through the slide shaft 93e. The plate 93h is provided with a plurality of holes 93i corresponding to the arrangement of the sucking pads 93a, so that the sucking pads 93a can move in and out the holes 93i of the plate 93h. With such construction as mentioned, when the cylinder 93d is actuated, the sucking pads 93a are protruded from the holes 93i of the plate 93h (the state as indicated by two dots chain line), and by returning the cylinder 93d in the state where a desired number of goods B are sucked by the sucking pads 93a, the goods B can be drawn onto a goods receiving plate 95a. That is, when the cylinder 93d is returned, the plate 93h is abutted against and stopped by a stopper 93j mounted on the base plate 93c, only the plate 93b on which the sucking pads 93a are mounted is returned, and by stopping the sucking action of the sucking pads 93a, the sucked goods B are released. With respect to the goods B having a comparatively large dimension in the depth direction relative to the dimension in the height direction, it may be designed such that after the goods B, which have been drawn onto the goods receiving plate 95a, are moved to a push-in portion L, the sucking operation of the sucking pad 93a is stopped. That is, as described in the foregoing, when the cylinder 93d is returned, the sucking pads 93a are hidden in holes 93i of the plate 93h. However, since the sucking pads 93a are made of rubber, they are readily deformed. Therefore, the goods B, while being sucked by the sucking pads 93a, are moved to the push-in portion L. And when the sucking operation of the sucking pads 93a is stopped, the sucking pads 93a release the goods B. Then, the sucking pads 93a return to the original states and are completely stored in the holes 93i.

The goods B, which have been drawn onto the goods receiving plate 95a, are moved to the push-in portion L on the container G side by the moving device 94.

The moving device 94 is adapted to rotate the sucking device 93 by 90 degrees (the state shown in FIG. 3c) and comprises, as shown in FIGS. 3a and 3b, a rotational shaft 94a for rotatably supporting the base plate 93c attached to a lower end of the sucking device 93, a link 94b for rotating the base plate 93c connected to one end of the rotational shaft 94a about the rotational shaft 94a, and a cylinder 94c disposed between the link 94b and the frame 96 and able to be expanded and contracted therebetween in order to rotate the base plate 93c. And, as is shown in FIG. 3c, after the goods B are moved to the push-in portion L through the moving device 94, the goods B are pushed into the container G by a push-in device 95. The push-in device 95 comprises a goods receiving plate 95a, an engaging piece 95b mounted on each side of an upper portion of the goods receiving plate 95a, and a rodless cylinder 95d for reciprocally moving the goods receiving plate 95a engaging with the guide 95c through the engaging piece 95b in the direction of the container G.

Next, there will be described one mode for carrying out a goods handling method (goods take-out method) of the present invention employing a goods handling facility using the goods removal tool 40 and the goods removal device E of this embodiment.

In the gravity flow rack 70 in the storage facility D, cases 10 containing, for example, goods accumulation group C consisting of one kind of goods B are plurally stored in the forward and backward direction. On the other hand, when the shutter 44 of the goods removal tool 40 is opened and the goods accumulation group C within the case 10 are transferred to the lifting table 91a of goods removal device E, the inverting device 30 is moved to a position corresponding to the goods removal tool 40 to which the empty case 10 is placed by the traveling action of the stacker crane 60 and the vertical movement of the carriage 50 to advance the traveling table 32 toward the goods removal tool 40, and the goods removal tool 40 and the empty case 10 are clamped by the first clamping hand 35, the second clamping hand 37 and the centering hand 38. At that time, the engaging convex portion of the first clamping hand 35 is brought into engagement with the engaging concave portion 45 of the goods removal tool 40. After the superposing device 31 is rotated by approximately 10 degrees clockwise from the state indicated by the two dotted chain line of FIG. 2 about the rotational shaft 34, the traveling table 32 is advanced to a position indicated by the solid line in FIG. 2 and meanwhile, the superposing device 31 is further rotated by approximately 170 degrees (the state indicated by the solid line in FIG. 2). clockwise. Then, in order to discharge the empty case 10 onto a discharge conveyor 120, when the empty case 10 is lowered to the level of the fixed conveyor 21 by the second clamping hand 37 and the fixed conveyor 21 is rotated clockwise, the empty case 10 is drop discharged onto the discharge conveyor 120. At that time, in order to secure a dropping space for the case 10, the traveling table 32 is retracted from the removal frontage 71 and the empty case 10 is dropped. After the empty case 10 has been dropped, the traveling table 32 is moved to a position corresponding to a predetermined removal frontage 71 by the vertical movement of the carriage 50 and the traveling action of the stacker crane 60 and thereafter the traveling table 32 is advanced to the removal frontage 71. Then, the swing conveyor 23 is swung counterclockwise about the supporting shaft 22, and the fixed conveyor 21 and the swing conveyor 23 are further rotated counterclockwise to take out the case 10 from the removal frontage 71 onto the second clamping hand 37. And when the traveling table 32 advances to the position indicated by the solid line, the traveling table 32 is moved to a position corresponding to a predetermined goods removal device E by the vertical movement of the carriage 50 and the traveling action of the stacker crane 60, and the second clamping hand 37 is moved upward. At the same time, the case 10 is centered by the centering hand 38 in order to superpose the case 10 on the goods removal tool 40 clamped by the first clamping device 35. As the case 10 is fed to the gravity flow rack 70 in such a state as having an opening portion of its top portion, by superposing the goods removal tool 40 on the opening portion of the case 10 and closing the opening portion by the shutter 44, the goods B contained in the case 10 are not dropped even if the case 10 is rotated by 180 degrees. The superposing device 31 is rotated counterclockwise by 170 degrees about the rotational shaft 34 to retract the traveling table 32 from the removal frontage 71 to advance to the goods removal device E, and then the superposing device 31 is further rotated by 10 degrees counterclockwise to place the goods removal tool 40 and the case 10 onto a frame 96 (the state indicated by the two dotted chain line of FIG. 2) in their inverted states and thereafter, the first clamping hand 35, and the centering hand 38 are opened to advance the traveling table 32 to a position as indicated by the solid line of FIG. 2, to thereby wait for the next shifting operation.

In this way, the case 10 is placed on the frame 96 of the goods removal device E together with the goods removal tool 40 and waited for the next shifting operation and the goods B on the lifting table 91a of the goods removal device E are all removal, the goods take-out tool 40 opens the shutter 44 and transfers the goods accumulation group C within the case 10 onto the lifting table 91a. At that time, in the goods removal device E, the movement restraining plate 92a is retracted to a position (the position indicated by the two dotted chain line of FIG. 3b) where the movement restraining plate 92a and the lifting table 91a do not interfere with each other along the cutaway groove, and thereafter, the lifting table 91a is lifted upwardly to immediate below the goods removal tool 40 and receives only the goods accumulation group C contained in the case 10 from the goods removal tool 40 in which the shutter 44 was opened. Succeedingly, the lifting table 91a is lowered until the bottom surface of the goods B of the uppermost stage of the goods accumulation group C is equal to a desired goods surface level (picking level) (see FIG. 3b) corresponding to the position of the goods receiving table 95a. And the movement restraining plate 92a pushes the goods accumulation group C on the lifting table 91a and stops at a position where the front surfaces of the goods accumulation group C are brought to be generally flushed with the front end of the lifting table 91a. Then, when the sucking device 93 sucks the goods B by a desired number (order number) with its sucking pads 93a and causes the cylinder 93d to draw the goods B onto the goods receiving plate 95a, the moving device 94 is actuated to incline the goods receiving plate 95a forwardly by 90 degrees so that the goods B are directly faced with the opening of the container G at the push-in portion L on the container G side shown in FIG. 3c, and thereafter, the push-in device 95 is actuated to advance the goods receiving plate 95a so that the goods B are pushed into the container G.

The control flow of the removal operation of the goods B will further be described with reference to FIG. 4 and FIGS. 5a through 5g. One mode for carrying out the goods removal method of this embodiment is such that the bottom level of the goods B on the bottom stage of the goods B which are in such a state as ready to be drawn onto and supported by the goods receiving plate 95a (state where upper stages of goods B are placed on lower stages of goods B and in the foregoing state, the goods B are ready to be drawn onto the goods receiving plate 95a), among a desired goods B is brought to be flush with the level of the goods receiving plate 95a by the lifting device 91 so that a plurality of goods B are simultaneously removed.

Figure 4:
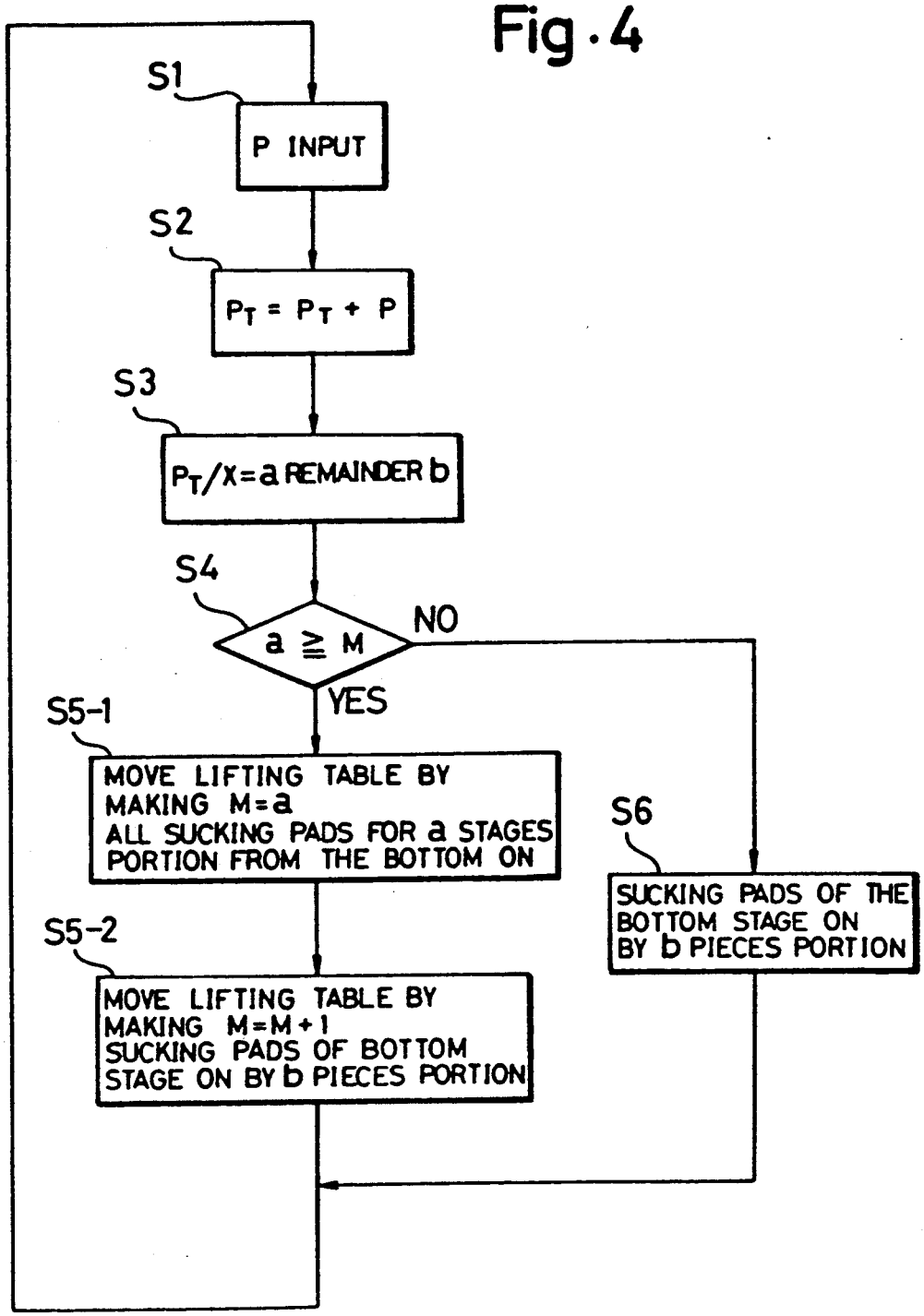
FIG. 4 is a flowchart showing one preferred embodiment of a goods take-out method in which the goods take-out apparatuses shown in FIGS. 3a, 3b and 3c are used respectively.

In the control flowchart of Fig. 4, order number is represented by P, the sum of order number by $P_T$, arrangement number of the goods B in the width direction (horizontal direction) by X, the quotient of a value obtained by dividing the sum of order number $P_T$ by a and its remainder by b, and the level of the lifting table 91a by M, and the initial values of the sum of order number $P_T$ and the level M of the lifting table 91a are defined as 0 and 1 respectively.

First, when the order number P is input into a computer (not shown) (step 1), the order number $P_T$ is added with the sum of order number $P_T$ (step 2), and the sum of order number $P_T$ obtained in step 2 is divided by the arrangement number X of the goods B arranged in the horizontal direction to find the quotient a and the remainder b (step 3). The quotient a obtained in step 3 is compared with the level M of the lifting table 91a in order to judge whether the quotient a is the level M or more (step 4). If the quotient a is the level M or more of the lifting table 91a, then it goes to step 5-1, and if the quotient a is less than the level M of the lifting table 91a, then it goes to step 6. In step 5-1, the current level M of the lifting table 91a is substituted by the quotient a in order to raise the lifting table 91a to a level (picking level) corresponding to the value of the quotient a and all sucking pads 93a covering a stages portion counted from the bottom are turned on to draw out the goods L. Then, it goes to step 5-2 where the current level M of the lifting table 91a is added with 1 to raise the lifting table 91a by one stage so that b pieces portion among the sucking pads 93a of the bottom stage are turned on to draw out the goods B by b pieces. In step 6, the lifting table 91a is not vertically moved and the sucking pads 93a of the bottom stage are turned on by b pieces in order to draw out the goods B. In step 4, if a=M, as the level of the lifting table 91a is not substituted in step 5-1, the lifting table 91a is not moved.

Figure 5A:
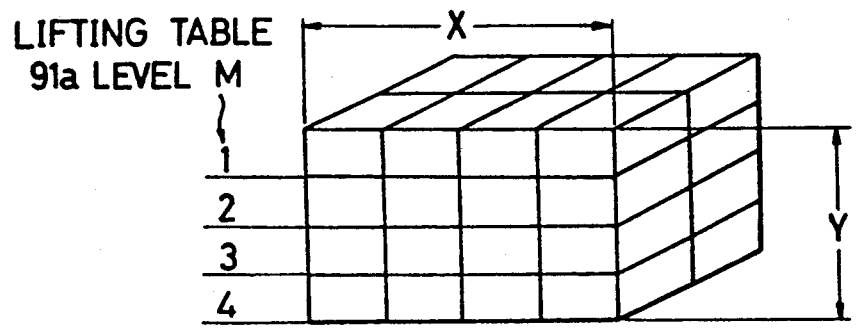
FIGS. 5a, 5b, 5c, 5d, 5e, 5f, and 5g are explanatory views for explaining the take-out order of goods respectively.
Figure 5B:
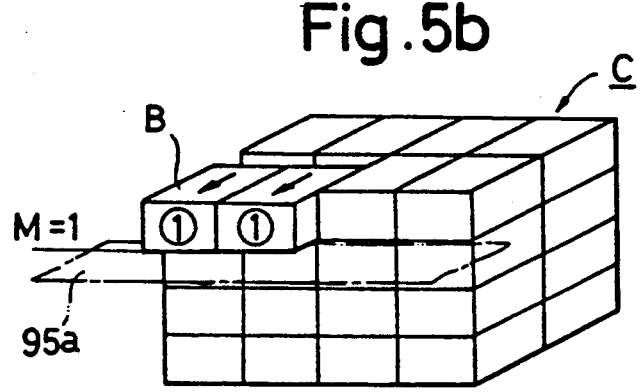
Figure 5C:
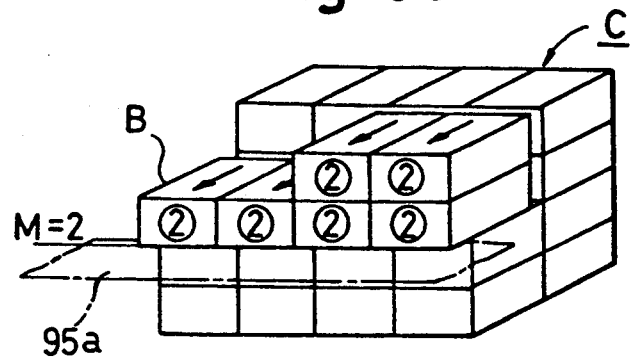
Figure 5D:
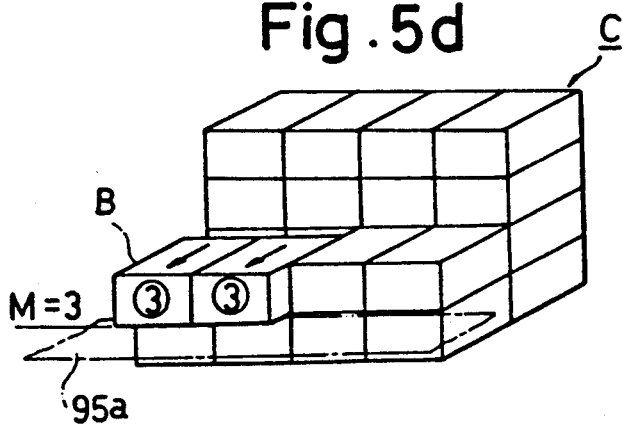
Figure 5E:
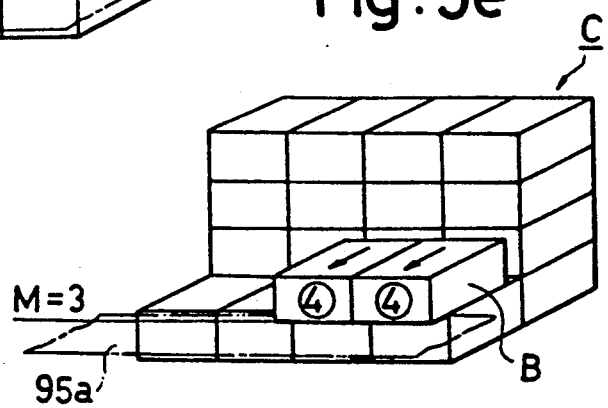
Figure 5F:
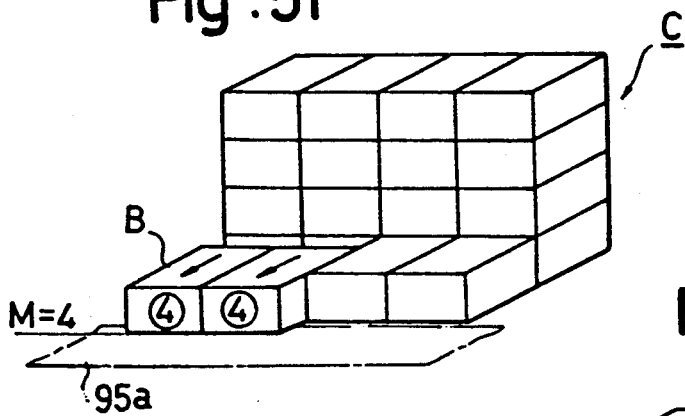
Figure 5G:
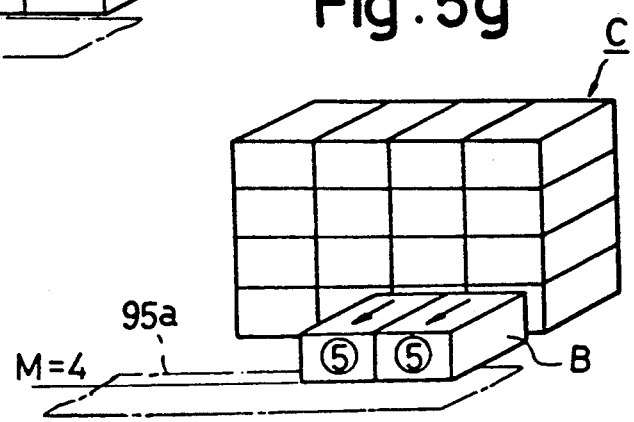

By inputting concrete numerical values, the removal operation of the above-mentioned flow will be described in more detail with reference to FIGS. 5a through 5g. The initial goods accumulation group C, as shown in FIG. 5a, comprises 4 pieces (X pieces) of goods B accumulated in the horizontal direction, 4 pieces (Y pieces) accumulated in the height direction (vertical direction), and 2 pieces accumulated in the depth direction (forward and backward direction). Suppose that the goods B are taken out from the goods accumulation group C in such order as, for example, order number 2→6→2→4→2 . . . . When the order number P=2 is input into the computer first (step 1), the order number P=2 is added to the initial value $P_T$=0 of the sum of order number $P_T$ and the sum $P_T$=2 of order number is registered (step 2) . Then, it goes to step 3 where $P_T$/X, that is, 2/4 is calculated. When the quotient a=0 and the remainder b=2 has been registered, it goes to step 4 where the quotient a is compared with the level M of the lifting table 91a and it is judged whether the quotient a is the level M or more of the lifting table 91a. Since the quotient a is 0 which is smaller than the initial value M=1 of the lifting table 91a, it goes to step 6 where the sucking pads 93a of the bottom stage are turned on by the number corresponding to the remainder b, that is, 2 pieces and two pieces of goods B indicated by ① of FIG. 5b are drawn out. That is, the cylinder 93d is actuated to urge the sucking pads 93a against the corresponding two pieces of goods B to cause the sucking pads 93a to suck and draw such two pieces of goods B onto the goods receiving plate 95a. Then, the sucking pads 93a are turned off or kept turned on, and the moving device 94 is actuated to rotate the base plate 93c by 90 degrees counterclockwise about the rotational shaft 94a in order to bring them into the states shown in FIG. 3c from the states shown in FIG. 3b, thereby to move the goods B to the push-in portion L. Thereafter, a rodless cylinder 95d of the push-in device 95 is actuated to cause the goods receiving plate 95a to advance to the container G side, thereby to push the two pieces of goods B into the container G. Then, when order number P=6 is input, it becomes the sum of order number $P_T$=8 and 8/4 is calculated based on this sum of order number $P_T$=8 to find the quotient a=2 and the remainder b=0 (steps 1 through 3). Thereafter, in step 4, the quotient a=2 is compared with the level M=1 of the lifting table 91a. Since the quotient a is larger than the level M of the lifting table 91a, it goes to step 5-1 where the value of the level M of the lifting table 91a is substituted by the quotient a=2, that is, the lifting table 91a is lifted upward to level 2, and by turning all sucking pads 93a covering the two stages portion counted from the bottom on, the goods B indicated by ② of FIG. 5c are drawn out all at once. Thereafter, it goes to step 5-2 where the level M of the lifting table 91a is added with 1 and the lifting table 91a is lifted upward by one stage. Thereafter, b pieces of goods B are usually drawn by turning on b pieces of sucking pads 93a among the sucking pads 93a of the bottom stage. In this case, however, no drawing operation is performed because b is 0. Then, when order number P=2 is input, it becomes the sum of order number $P_T$=10, and 10/4 is calculated based on this sum of order number $P_T$=10 to find the quotient a=2 and the remainder b=2 (steps 1 through 3). Then, the quotient a=2 is compared with the level M=3 of the lifting table 91a in step 4. Since the quotient a is smaller than the level M of the lifting table 91a, it goes to step 6 where two pieces of the sucking pads 93a of the bottom stage corresponding to the remainder b=2 are turned on to draw out the two pieces of goods B indicated by ③ of FIG. 5d. Then, when the order number P=4 is input, it becomes the sum of order number $P_T$=14 and 14/4 is calculated to find the quotient a=3 and the remainder b=2 (steps 1 through 3). In step 4, the quotient a=3 is compared with the level M=3 of the lifting table 91a. Since the quotient a is equal to the level M of the lifting table 91a, it goes to step 5-1. Since the quotient a is equal to the level M of the lifting table 91a, the lifting table 91a is not moved and by turning all sucking pads 93a covering a stages portion counted from the bottom on, two pieces of goods B indicated by ④ of FIG. 5e are drawn out. Thereafter, it goes to step 5-2 where the level M=3 of the lifting table 91a is added with 1 to raise the lifting table 91a by one stage and then, the two pieces of sucking pads of the bottom stage corresponding to the remainder b=2 portion on to draw out the two pieces of goods B indicated by ④ of FIG. 5f. When the order number P=2 is input, it becomes the sum of order number $P_T$=16 and 16/4 is calculated to find the quotient a=4 and the remainder b=0 (steps 1 through 3). In steps 4, the quotient a=4 is compared with the level M=4 of the lifting table 91a. Since the quotient a is equal to the level M of the lifting table 91a, it goes to step 5-1 where the lifting table 91a is not moved as already mentioned above and by turning all sucking pads 93a covering a stages portion counted from the bottom on, two pieces of goods B indicated by ⑤ of FIG. 5g are drawn out. When all goods B on the first row in the forward and backward direction have been taken out in the manner as mentioned above, the moving restraining plate 92a is advanced to move the goods B on the second row in the forward and backward direction to the front end of the lifting table 91a and the next taking out operation is performed in the manner as mentioned above.

Therefore, according to the present invention, the bottom level of a desired goods B among the goods accumulation group C, as mentioned above, is brought to be generally flush with the height of the goods receiving plate 95a by the lifting device 91, the goods B are restrained by the movement restraining device 92 in order not to be moved in a direction opposite to the taking out direction of the goods B, the goods accumulation group C are moved toward the sucking device 93 side, then a desired goods B is sucked by the sucking pad 93a in order to be drawn onto the goods receiving plate 95a, then the goods B drawn onto the goods receiving plate 95a is moved to the push-in portion L of the container G while being in a state where the goods B are released from being sucked or continue being sucked then the goods B are pushed into the container G by the goods receiving plate 95a, or otherwise all goods B on the front row are taken out, then the goods B on the next row are moved to the front row and thereafter the goods B are taken out, thereby a desired number of goods B can be sequentially taken out of the goods accumulation group C comprising goods B accumulated and such taken-out goods B can be discharged into (stored in) the container G. Accordingly, a desired number of goods B can rapidly and reliably taken out in an automatic manner and in a stable state. This can be particularly suitably used for picking operation of the goods B in a distribution center or the like.

EMBODIMENT 2

This embodiment is an embodiment of a second apparatus invention and an embodiment of a method of the present invention using the apparatus of this embodiment.

Figure 6:
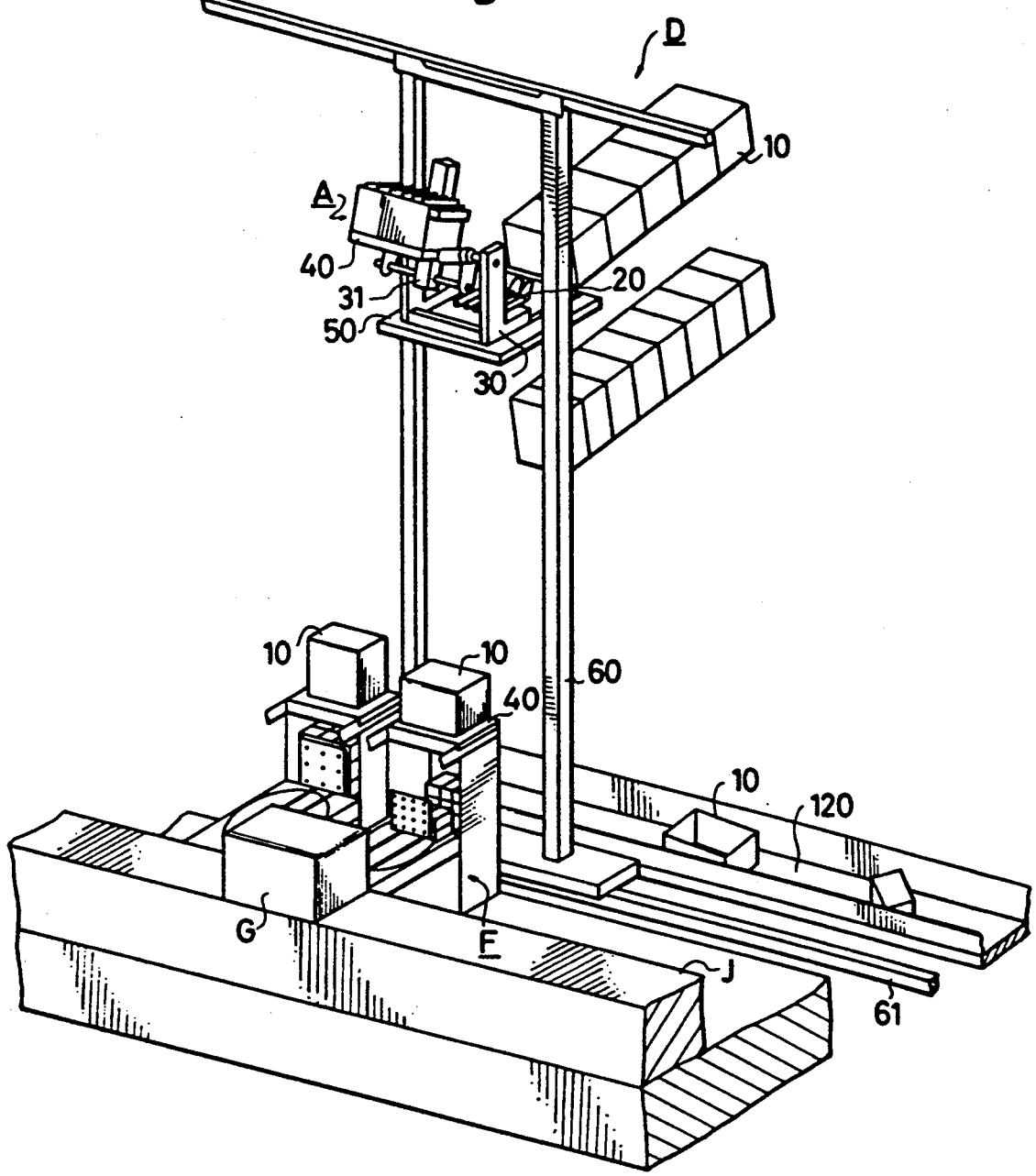
FIG. 6 is a perspective view showing another embodiment of a goods handling facility using a goods handling apparatus (second apparatus invention) of the present invention.
Figure 7:
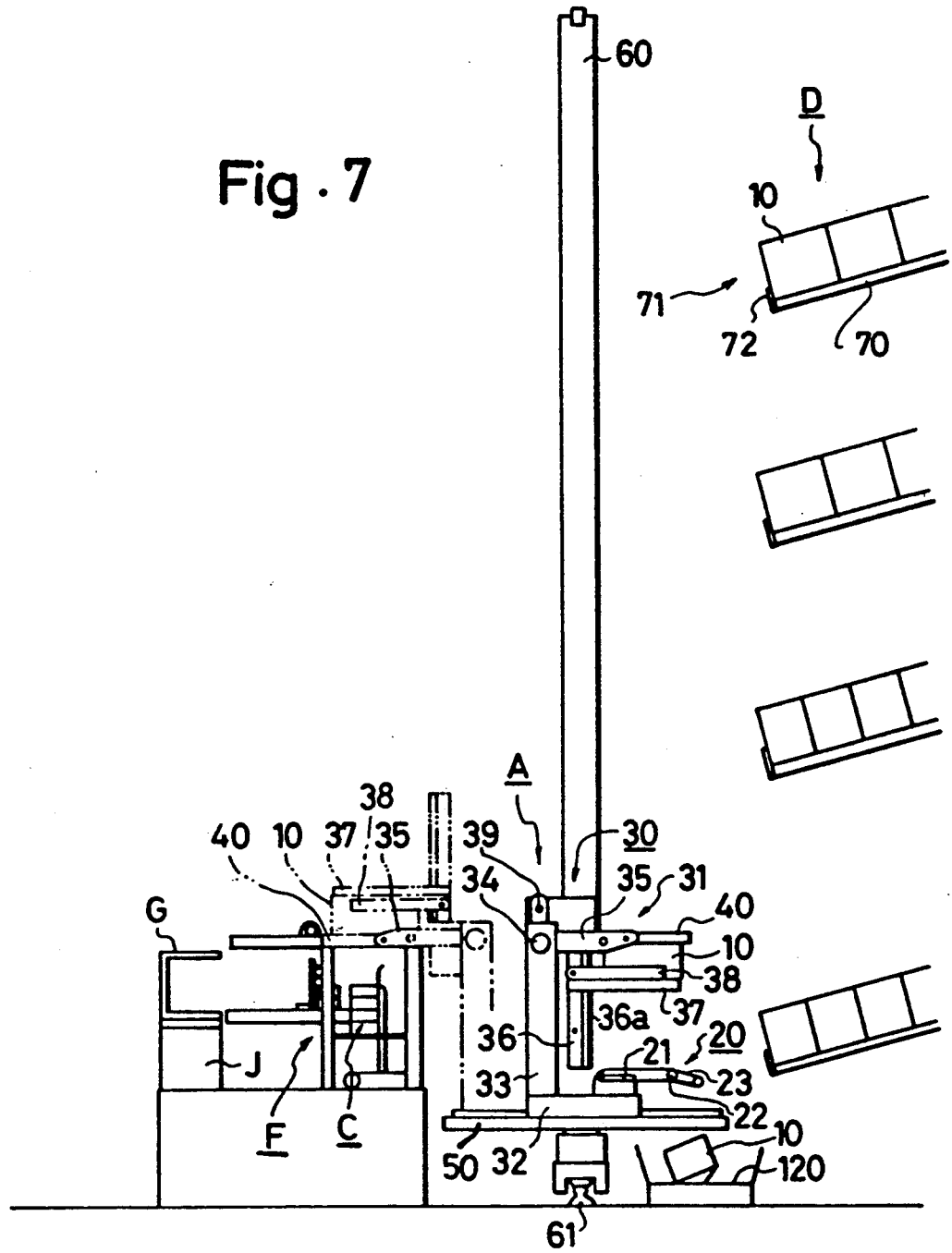
FIG. 7 is a side view thereof.

A goods take-out apparatus F according to an embodiment of the second apparatus invention, as shown in FIGS. 6 and 7, comprises a storage facility D for storing cases 10 containing the goods B as a goods accumulation group C as will be described afterward in a plurality of stages and in a plurality of rows, a goods shifting apparatus A disposed in such a manner as to be able to move upward and downward, and leftward and rightward at a front end of the storage facility D and adapted to shift the cases 10 from the storage facilities D, a goods take-out device F disposed in such a manner as to be adjacent to the goods shifting apparatus A and adapted to take out the goods B by a desired number from the goods accumulation group C which have been shifted from the cases 10 by the goods shifting apparatus A, a container G for storing the goods B which have been taken out from the goods take-out device F, and a carrier conveyor J for conveying the container G to the next process.

The goods shifting apparatus A comprises a case removal device 20 for removing a case 10 from the storage facility D, a superposing device 31 for lifting the case 10 removed by the case removal device 20 and superposing the same on a goods removal tool 40 disposed thereabove, an inverting device 30 for inverting the case 10 and the goods removal tool 40 to the goods removal device F side as will be described afterward, a carriage 50 with the case removal device 20 and the inverting device 30 placed thereon, and a stacker crane 60 for vertically movably supporting the carriage 50 and able to reciprocally move rightward and leftward. The goods handling facility to which the goods removal device F according to an embodiment of the second apparatus invention is applied is constructed in the same manner as the apparatus of the above-mentioned embodiment excepting the goods removal device F.

Also, the goods removal device F of this embodiment, as shown in FIGS. 7, 8a, and 8b, comprises a lifting device 101 for receiving and supporting the goods accumulation group C from the case 10 inverted by the goods shifting apparatus A through the goods removal tool 40 and for moving upward and downward the bottom surface of the desired number of goods B to the removal position, a goods restraining device 102 for restraining the goods accumulation group C within the lifting device 101 in order not to move in the direction opposite to the removal direction of the goods accumulation group C and for moving the goods accumulation group C toward the sucking device 103 side, the sucking device 103 for reciprocally moving the sucking tools (sucking pads) 103a corresponding to the arrangement of the goods B of the goods accumulation group C in the depth direction and for sucking and removing a desired number of goods B, a goods receiving table 104a for receiving the goods B taken out by the sucking pad 103a of the sucking device 103, and a moving device 104 for moving the goods B taken out to the goods receiving table 104a to the push-in position (push-in portion) L, the goods B moved to the push-in portion L being pushed into the container G by the goods receiving table 104a.

The goods removal tool 40, the case removal device 20, and the inverting device 30, for constituting the goods shifting apparatus A, as shown in FIGS. 6 through 8a and 8b, are constructed in the same manner as those of the above-mentioned EMBODIMENT 1 and description on the construction of the same component parts will be omitted and mostly the goods removal device F of this embodiment will be described with reference to FIGS. 8a and 8b.

That is, the goods removal device F is disposed between the carrier conveyor J for carrying the container G and the travel rail 61. The goods take-out device F is adapted to receive the goods accumulation group C from the goods removal tool 40 and pushes a required number of goods B into the container G. The lifting device 101 receives the goods accumulation group C taken out of the case 10 through the goods removal tool 40 and moves upward and downward to a desired position. The lifting device 101, as shown in FIG. 8a, comprises the lifting table 101a on which the goods accumulation group C are placed, a wire 101b for lifting the four corners of the lifting table 101a, and a pair of pulleys 101c, 101d having the wire 101b wound thereon and rotatably mounted on the frame 106, and a motor (not shown) for driving the lower pulley 101d through a driving shaft 101 connected with belts 101e, 101e wound thereon or the like.

Also, the movement restraining device 102, as shown in FIGS. 8a and 8b, contacts the goods accumulation group C supported on the lifting table 101a of the lifting device 101 from a rear side (right-hand side in FIG. 8b) thereof and moves them toward the container G. The movement restraining device 102 comprises a pair of sprockets 102d, 102e disposed beneath front and rear leg portions of the frame 106, a chain 102d looped around the sprockets 102c, 102e, and a movement restraining plate 102a connected with the chain 102d and erected around the leg portions through mounting metal pieces 102b, the movement restraining plate 102a being able to be reciprocally moved forward and backward by a drive motor 102f. The mounting metal piece 102b for supporting the movement restraining plate 102a is reciprocally moved along a cut-away groove (not shown) formed in the lifting table 101a. By moving (advancing) the movement restraining plate 102a toward the container G, the goods accumulation group C is brought to a front edge of the lifting table 101a and the backward movement of each goods B is restrained. The goods accumulation group C advanced to the front edge of the lifting table 101a through the movement restraining device 102 is moved upward and downward to a position where the bottom level of desired goods B corresponds to the picking number by the lifting device 101, and a desired number of goods B are drawn into the goods receiving table 104a by the sucking device 103. The lifting device 101 and the goods restraining device 102 is constructed in the manner as those in the aforementioned first apparatus invention.

The sucking device 103 comprises sucking pads 103a disposed in such a manner as to correspond to X pieces of goods B arranged in the width direction and Y pieces of goods B arranged in the height direction of the goods accumulation group C, a plate 103b on which the sucking pads 103a are attached, a rodless cylinder 103d disposed on a rear surface of the goods receiving table 104a in order to reciprocally move the plate 103b in the forward and backward direction, and a pair of moving pieces 103c, 103c for connecting the rodless cylinder 103d with the plate 103b and being able to move in the forward and backward direction along a pair of grooves 104b, 104b of the goods receiving table 104. Also, the moving device 104 comprises a disc-like goods receiving table 104a for receiving the goods B, a pair of grooves 104b, 104b formed In the goods receiving table 104a and adapted to guide the moving pieces 103c, 103c of the sucking device 103 in the forward and backward direction, an intermediate plate 104c disposed in such a manner as to surround the goods receiving table 104a in order to smoothly transfer the goods B, which have been transferred to the goods receiving table 104a from the lifting table 101a by the sucking pads 103a of the sucking device 103 guided by the pair of grooves 104b, 104b, into the container G from the goods receiving table 104a, and a motor 104d connected to the center of a rear surface of the goods receiving table 104a surrounded by the intermediate plate 104c l and adapted to revolve by 180 degrees about a vertical axis. With the foregoing construction, by actuating the rodless cylinder 103d of the sucking device 103, the sucking pads 103a are moved in the forward and backward direction through the moving piece 103c and the plate 103b order to be urged against the goods B and returning the sucking pads 103a, the goods B can be taken onto the goods receiving table 104a. By sequentially actuating the motor 104d oil the moving device 104, the goods B, which have been taken onto the goods receiving table 104a, are swung by 180 degrees to the push-in portion L and by actuating the rodless cylinder 103d of the sucking device 103 again, the goods B can be pushed into the container G.

Next, one mode for carrying out a goods handling method (goods removal method) employing the goods handling facilities using the goods removal tool 40 and the goods removal device F of this embodiment will be described.

In the gravity flow rack 70 in the storage facilities D, cases 10 containing, for example, goods accumulation group C consisting of one kind of goods B are plurally stored in the forward and backward direction. On the other hand, when the shutter 44 of the goods removal tool 40 is opened and the goods accumulation group C within the case 10 are transferred to the lifting table 101a of goods take-out device F, the inverting device 30 is moved to a position corresponding to the goods removal tool 40 to which the empty case 10 is placed by the traveling action of the stacker crane 60 and the vertical movement of the carriage 50 to advance the traveling table 32 toward the goods removal tool 40, and the goods removal tool 40 and the empty case 10 are clamped by the first clamping hand 35, the second clamping hand 37 and the centering hand 38. At that time, the engaging convex portion of the first clamping hand 35 is brought into engagement with the engaging concave portion 45 of the goods removal tool 40. And after the superposing device 31 is rotated by approximately 10 degrees clockwise from the state indicated by the two dotted chain line of FIG. 7 about the rotational shaft 34, the traveling table 32 is advanced to a position indicated by the solid line in FIG. 7 and meanwhile, the superposing device 31 is further rotated by approximately 170 degrees (the state indicated by the solid line in FIG. 7) clockwise. Then, in order to discharge the empty case 10 onto a discharge conveyor 120, when the empty case 10 is lowered to the level of the fixed conveyor 21 by the second clamping hand 37 and the fixed conveyor 21 is rotated clockwise, the empty case 10 is drop discharged onto the discharge conveyor 120. At that time, in order to secure a dropping space for the case 10, the traveling table 32 is retracted from the removal frontage 71 and the empty case 10 is dropped. After the empty case 10 has been dropped, the traveling table 32 is moved to a position corresponding to a predetermined removal frontage 71 by the vertical movement of the carriage 50 and the traveling action of the stacker crane 60 and thereafter the traveling table 32 is advanced to the removal the frontage 71. Then, the swing conveyor 23 is swung counterclockwise about the supporting shaft 22, and the fixed conveyor 21 and the swing conveyor 23 are further rotated counterclockwise to take out the case 10 from the removal frontage 71 onto the second clamping hand 37. And when the traveling table 32 advances to the position indicated by the solid line, the traveling table 32 is moved to a position opposite to a predetermined goods removal device F by the vertical movement of the carriage 50 and the traveling action of the stacker crane 60, and the second clamping hand 37 is moved upward. At the same time, the case 10 is centered by the centering hand 38 in order to superpose the case 10 on the goods removal tool 40 clamped by the first clamping device 35. As the case 10 is fed to the gravity flow rack 70 in such a state as having an opening of its top portion, by superposing the goods removal tool 40 on the opening portion of the case 10 and closing the opening portion by the shutter 44, the goods B contained in the case 10 are not dropped even if the case 10 is rotated by 180 degrees. The superposing device 31 is rotated counterclockwise by 170 degrees about the rotational shaft 34 to retreat the traveling table 32 from the removal frontage 71 to advance to the goods removal device F, and then the superposing device 31 is further rotated by 10 degrees counterclockwise to place the goods removal tool 40 and the case 10 onto a frame 106 (the state indicated by the two dotted chain line of FIG. 7) in their inverted states and thereafter, the first clamping hand 35, and the centering hand 38 are opened to advance the traveling table 32 to a position as indicated by the solid line of FIG. 7, thereby to wait for the next shifting operation.

In this way, the case 10 is placed on the frame 106 of the goods removal device F together with the goods removal tool 40 and waited for the next shifting operation and the goods B on the lifting table 91a of the goods removal device F are all taken out, the goods removal tool 40 opens the shutter 44 and transfers the goods accumulation group C within the case 10 onto the lifting table 101a. At that time, in the goods removal device F, the movement restraining plate 102a is retracted to a position (the position indicated by the two dotted chain line the of FIG. 8b) where the movement restraining plate 102a and the lifting table 101a do not interfere with each other along the cutaway groove, and thereafter, the lifting table 101a is lifted upwardly to immediate below the goods removal tool 40 and receives only the goods accumulation group C contained in the case C from the goods removal tool 40 in which the shutter 44 was opened. Succeedingly, the lifting table 101a is lowered until the bottom surface of the goods B of the uppermost stage of the goods accumulation group C is equal to a desired goods surface level (picking level) (see FIG. 8b) corresponding to the position of the goods receiving table 104a. And the movement restraining plate 102a pushes the goods accumulation group C on the lifting table 101a and stops at a position where the front surfaces of the goods accumulation group C are brought to be generally flush with the front end of the lifting table 101a. Then, when the sucking device 103 sucks the goods B by a desired number (order number) with its sucking pads 103a and actuates the rodless cylinder 103d to draw the goods B onto the goods receiving table 104a, the moving device 94 is actuated to incline the goods receiving table 104a by 180 degrees so that the goods B are directly faced with the opening of the container G at the push-in portion L on the container G side, and thereafter, the rodless cylinder 103d is actuated again to advance the sucking pads 103a toward the container G side so that the goods B are pushed into the container G.

The one mode for carrying out a goods take-out method using a goods removal device F of this embodiment is such that the bottom level of the goods B on the bottom stage of the goods B which are in such a state as ready to be drawn onto and supported by the goods receiving table 104a (state where upper stages of goods B are placed on lower stages of goods B and in the foregoing state, the goods B are ready to be drawn onto the goods receiving table 104a) among desired goods B are brought to be flush with the level of the goods receiving table 104a by the lifting device 101 so that a plurality of goods B are simultaneously taken out. This operation is performed in accordance with the control flow of FIG. 4.

Therefore, by inputting concrete numerical values, the take-out operation of the above-mentioned flow will be described in more detail with reference to FIGS. 4, and 9a through 9e.

Figure 9A:
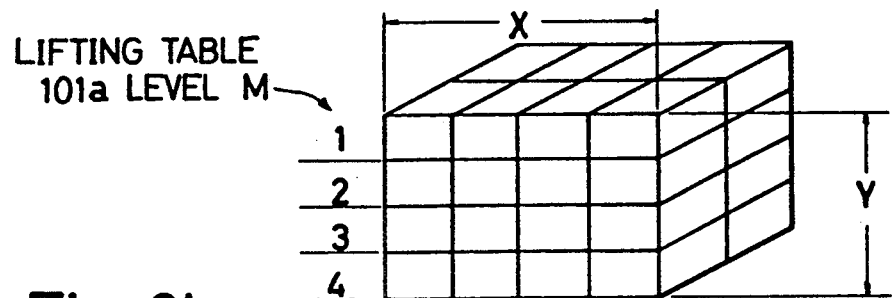
FIGS. 9a, 9b, 9c, 9d, and 9e are explanatory views for explaining the order for taking out goods respectively.
Figure 9B:
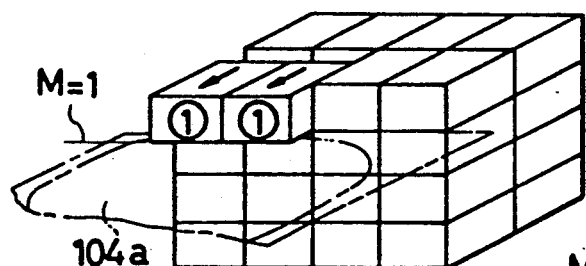
Figure 9C:
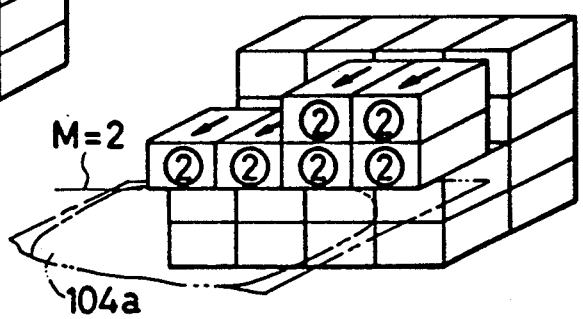
Figure 9D:
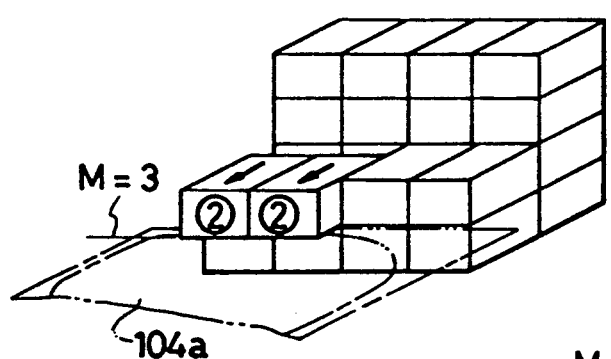
Figure 9E:
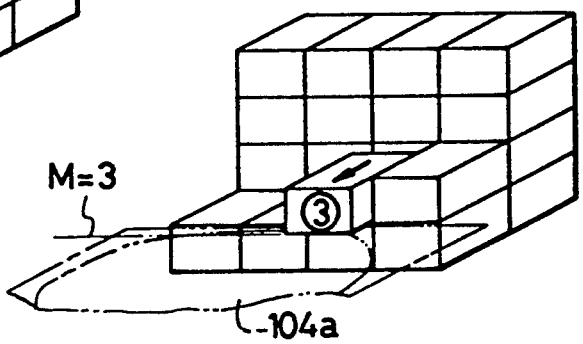
Figure 10A:
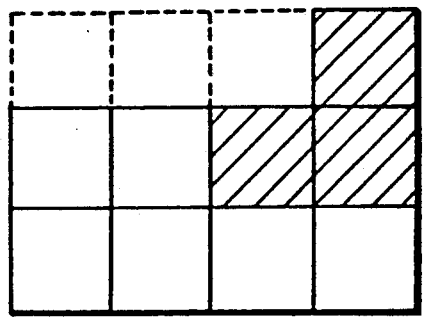
FIGS. 10a, 10b, 10c and 10d are explanatory views for explaining a goods take-out method and its order which are different from those of FIG. 4, FIGS. 5a through 5g and Figs. 9a through 9e.
Figure 10B:
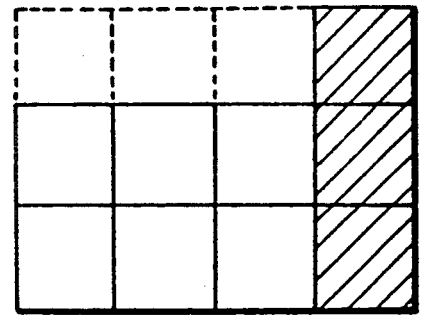
Figure 10C:
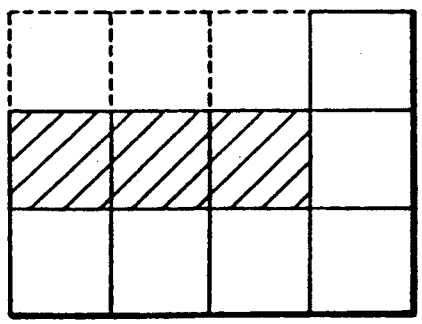
Figure 10D:
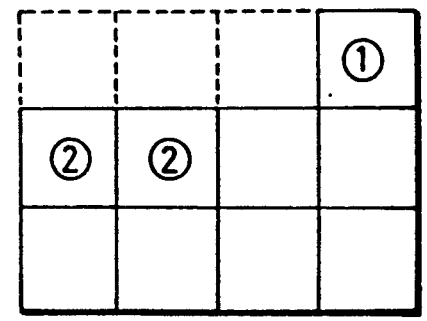

The initial goods accumulation group C, as shown in Fig. 9a, comprises 4 pieces (X pieces) of goods B accumulated in the horizontal direction, 4 pieces (Y pieces) accumulated in the height direction (vertical direction), and 2 pieces accumulated in the depth direction (forward and backward direction). Suppose that the goods B are taken out from the goods accumulation group C in such order as, for example, order number 2→8→1→2. ... When the order number P=2 is input into the computer first (step 1), the order number P=2 is added to the initial value $P_T=0$ of the sum of order number $P_T$ and the sum $P_T=2$ of order number is registered (step 2). Then, it goes to step 3 where $P_T/X$, that is, 2/4 is calculated. When the quotient a=0 and the remainder b=2 has been registered, it goes to step 4. Since the quotient a is smaller than the level M=1 of the lifting table 101a, it goes to step 6 where the sucking pads of the bottom stage are turned on by two piece portion and two pieces of goods B indicated by ① are drawn out (see FIG. 9b). That is, the rodless cylinder 103d is actuated to urge the sucking pads 103a against the corresponding two pieces of goods B to cause the sucking pads 103a to suck and draw such two pieces of goods B onto the goods receiving table 104a. Then, the rodless cylinder 103d of the sucking device 103 is actuated to advance the plate 103b toward the goods receiving table 104a side through the moving piece 103c in order to take the goods B onto the goods receiving table 104a. Then, the motor 104d is actuated to rotate. the goods receiving table 104a by 180 degrees in order to move the goods B. to the push-in portion L. After being inverted, the rodless cylinder 103d is actuated to cause the plate 103b and the sucking pads 103a to advance to the container G side, to thereby push the goods B into the container G. At the same time, the activation of the sucking pads 103 is stopped to release the goods B within the container G.

Then, when order number P=8 is input, it becomes the sum of order number $P_T=10$ and 10/4 is calculated based on this sum of order number $P_T=10$ to find the quotient a=2 and the remainder b=2 (steps 1 through 3). Thereafter, in step 4, the quotient a=2 is compared with the level M=1. Since the quotient a is larger than the level M of the lifting table 101a, it goes to step 5-1 where the value of the level M of the lifting table 101a, that is, the lifting table 101a is substituted by the M=2 to lift the lifting table 101a upward to level 2, and by turning all sucking pads 103a covering the two stages portion counted from the bottom on, the goods B indicated by ② are drawn out all at once (see FIG. 9c). Thereafter, it goes to step 5-2 where the level M of the lifting table 101a is added with 1 so as to be substituted by M=3 and the lifting table 101a is lifted upward by one stage. Thereafter, two sucking pads 103a among the sucking pads 103a of the bottom stage are turned on in order to draw two pieces of goods B (see Fig. 9d), When order number P=1 is input, it becomes the sum of order number $P_T=11$, and 11/4 is calculated based on this sum of order number $P_T=11$ to find the quotient a=2 and the remainder b=3 (steps 1 through 3). Then, a=2 is compared with M=3 in step 4. Since the quotient a is smaller than the level M of the lifting table 101a, it goes to step 6 where the three pieces portion sucking pads 103a of the bottom stage are turned on to draw out one piece of goods B indicated by ③ (see FIG. 9e). The take-out operation is continued thereafter in accordance with the above-mentioned logic. When all goods B on the first row in the forward and backward direction have been taken out, the goods restraining plate 102a is advanced to move the goods B on the second row in the forward and backward direction to the front end of the lifting table 103a and the next taking out operation is performed in the manner as mentioned above.

Therefore, according to the present invention, the bottom level of a desired goods B among the goods accumulation group C, as mentioned above, is brought to be generally flush with the height of the goods receiving table 104a by the lifting device 101, the goods B are restrained by the goods restraining device 102 in order not to be moved, and in that state, desired goods B are sucked by the sucking pad 103a in order to be drawn onto the goods receiving table 104a, then the goods B drawn onto the goods receiving table 104a are moved to the push-in portion L of the container G or the like. Then the goods B can be push discharged into a container, etc. by the sucking pads 103a. Therefore, a desired number of goods B can rapidly and reliably taken out in an automatic manner and in a stable state and therefore, same operation and effects as those of the method of the embodiment using the apparatus of the embodiment of the above-mentioned first apparatus invention can be expected.

Although there have been described a method for sequentially taking the goods B on the first row in the forward and backward direction of the goods accumulation group C first from the above downward and from left to right at each stage in the above embodiments, it goes without saying that a goods handling method using the goods handling apparatus of the present invention is by no means limited to the above-mentioned embodiments and/or modes. For example, in order to draw out a desired number of goods B by one action, it may be arranged such that the steps 5-1 and 5-2 are simultaneously executed. Also, in case additional three pieces of goods B are taken out in a state where three pieces of goods B comprising four pieces arranged in the width direction and three pieces arranged in the height direction have been taken out, they may be taken out in accordance with the procedures of two steps as mentioned above or otherwise three pieces of goods B indicated by hatching of FIGS. 10a through 10c may be drawn out by one action. In these cases, as the number of taking out operation can be reduced by one, a more efficient method for taking out the goods B can be obtained. Also, by registering a previous value of the remainder b in the computer as $b_o$, the goods B can be taken out by all sucking pads 93a (103a) covering a stages portion counted from the bottom excluding sucking pads 93a (103a) covering $b_o$ piece portion, that is, the sucking pads 93a (103a) covering $b_o$ piece portion being turned off, in step 5-1 of FIG. 4. Furthermore, in step 6, the goods B may be taken out by the sucking pads 93a (103a) covering b piece portion of the bottom stage excluding the sucking pads 93a (103a) covering $b_o$ piece portion, that is, the sucking pads 93a (103a) covering $b_o$ piece portion being turned off.

Also, in the above embodiments, the goods B are moved upward and downward. However, the goods handling apparatus of the present invention may be designed such that the sucking device 93 (103) and the goods receiving table 95a (104a) of the above-mentioned embodiments are moved upward and downward. Also, the goods handling apparatus of the present invention may be designed such that the sucking pads 93a (103a) of the goods take-out device F of the above-mentioned embodiments are not disposed in such a manner as to correspond to the arrangement of the goods accumulation group C consisting of the goods B arranged in the width direction by X pieces and in the height direction by Y pieces, but the sucking pads 93a (103a) covering one stage portion are arranged in the horizontal direction by X pieces. In that case, it is preferable that the speed of rotation of the goods receiving table 95a (104a) is set such that the goods B are not jumped out owing to centrifugal force.

Also, the goods handling apparatus of the present invention may be designed such that the goods shifting apparatus A is omitted and the case 10 is superposed on the goods removal tool 40 by hand. The goods removal tool 40 may also be omitted and the goods accumulation group C may be set on the lifting table 91a (101a) by hand. Also, it may be designed such that the goods B are directly taken into a tray-like container or onto a conveyor instead of the container G.

What is claimed is:

1. A goods handling apparatus, in which a desired number of goods are sequentially removed from a group of accumulated goods formed of a plurality of goods accumulated in a height direction, a plurality of goods accumulated in a depth direction and one or more goods accumulated in a width direction, and a device for discharging such removed goods into a container, said goods handling apparatus comprising:
    a lifting device movable upward and downward while supporting said group of accumulated goods;
    a sucking device for sucking and removing a desired number of goods by reciprocally moving sucking tools corresponding to the arrangement of goods of said group of accumulated goods in said depth direction;
    a goods restraining device for moving said group of accumulated goods toward said sucking device;
    a goods receiving table for receiving the goods removed by said sucking tools of said sucking device and discharging goods into said container; and
    a moving device for moving the goods placed onto said goods receiving table to a pushing position, the goods which have been moved to said pushing position being pushed and discharged into said container by said goods receiving table.

2. The goods handling apparatus as claimed in claim 1, wherein said goods receiving table is rotatable by approximately 90 degrees about a horizontal axis by said moving device.

3. A goods handling apparatus, in which a desired number of goods are sequentially removed from a group of accumulated goods formed of a plurality of goods accumulated in a height direction, a plurality of goods accumulated in a depth direction and one or more goods accumulated in a width direction and a device for discharging such goods into a container, said goods handling apparatus comprising:
    a lifting device for supporting and moving upward and downward said group of accumulated goods;
    a sucking device for sucking and removing a desired number of goods by reciprocally moving sucking tools corresponding to the arrangement of goods of said group of accumulated goods in said depth direction;
    a goods restraining device for moving said group of accumulated goods toward said sucking device;
    a goods receiving table for receiving the goods removed by said sucking tools of said sucking device and discharging goods into said container; and
    a moving device for moving the goods placed onto said goods receiving table to a pushing position, the goods which have been moved to said pushing position being pushed and discharged into said container by said sucking tools.

4. The goods handling apparatus as claimed in claim 3, wherein said sucking device is reciprocally movable on said goods receiving table.

5. The goods handling apparatus as claimed in claims 3 or 4, wherein said goods receiving table is rotatable by approximately 180 degrees.

* * * * *